US008330878B2

(12) United States Patent
Raines et al.

(10) Patent No.: US 8,330,878 B2
(45) Date of Patent: Dec. 11, 2012

(54) REMOTELY CONTROLLABLE MEDIA DISTRIBUTION DEVICE

(75) Inventors: Moshe Raines, Tel Aviv (IL); Ran Carmeli, St., Rinatya (IL)

(73) Assignee: Sandisk IL Ltd., Kfar Saba (IL)

( * ) Notice: Subject to any disclaimer, the term of this patent is extended or adjusted under 35 U.S.C. 154(b) by 1458 days.

(21) Appl. No.: 11/710,908

(22) Filed: Feb. 27, 2007

(65) Prior Publication Data

US 2007/0260808 A1 Nov. 8, 2007

Related U.S. Application Data

(60) Provisional application No. 60/746,653, filed on May 8, 2006.

(51) Int. Cl.
*H04N 21/2183* (2011.01)

(52) U.S. Cl. ......... 348/838; 348/158; 348/61; 455/41.2; 455/500; 455/501; 455/419

(58) Field of Classification Search .................. 348/838, 348/61, 158, 376; 455/41.2, 500, 501, 418, 455/419
See application file for complete search history.

(56) References Cited

U.S. PATENT DOCUMENTS

| 6,073,201 | A | 6/2000 | Jolley et al. |
| 6,148,354 | A * | 11/2000 | Ban et al. ...................... 710/301 |
| 6,775,715 | B2 | 8/2004 | Spitaels et al. |
| 6,934,467 | B1 | 8/2005 | Herz |
| 7,213,766 | B2 * | 5/2007 | Ryan et al. ..................... 235/492 |
| 7,624,417 | B2 * | 11/2009 | Dua .............................. 725/114 |
| 7,716,400 | B2 | 5/2010 | Raines et al. |
| 7,826,833 | B2 * | 11/2010 | Madhavan et al. ............ 455/418 |
| 8,120,707 | B2 | 2/2012 | Raines |
| 2001/0049826 | A1 | 12/2001 | Wilf |
| 2002/0180894 | A1 | 12/2002 | Okajima et al. |

(Continued)

FOREIGN PATENT DOCUMENTS

CN ZL 2007 8 002057.8 9/2011

(Continued)

OTHER PUBLICATIONS

Chinese Second Official Action for Chinese Application No. 200780014150.6 (Nov. 11, 2010).

(Continued)

*Primary Examiner* — William Gilbert
*Assistant Examiner* — Alp Akbasli
(74) *Attorney, Agent, or Firm* — Jenkins, Wilson, Taylor & Hunt, P.A.

(57) ABSTRACT

A portable storage device having a memory and a wireless remote control receiver is equipped for connection to a digital content player, which is controllable by a wireless remote control transmitter. The memory stores digital content data. The remote control transmitter communicates with the remote control receiver to play the digital content data on the digital content player. Accordingly, an additional remote control transmitter is not necessary for the remote control playing of digital content data residing on the portable storage device. The digital content data may be loaded from an external source, such as a personal computer. The personal computer can also be controlled to play the digital content data by using remote control transmitter using a known protocol. Thus, a user wishing to play the digital content data stored in the portable storage device does not need to acquire an additional specially-matched remote control transmitter.

16 Claims, 4 Drawing Sheets

U.S. PATENT DOCUMENTS

| | | | |
|---|---|---|---|
| 2003/0023329 A1 | 1/2003 | Brooks, Jr. et al. | |
| 2003/0126593 A1 | 7/2003 | Mault | |
| 2003/0176935 A1 | 9/2003 | Lian et al. | |
| 2003/0179100 A1* | 9/2003 | Zustak et al. | 340/825.22 |
| 2004/0056841 A1 | 3/2004 | Slotta | |
| 2004/0117442 A1* | 6/2004 | Thielen | 709/203 |
| 2004/0143716 A1* | 7/2004 | Hong | 711/170 |
| 2004/0182938 A1 | 9/2004 | Chen et al. | |
| 2005/0005045 A1 | 1/2005 | Kim et al. | |
| 2005/0108462 A1 | 5/2005 | Choi et al. | |
| 2005/0135792 A1 | 6/2005 | Han | |
| 2005/0227773 A1 | 10/2005 | Lu et al. | |
| 2006/0059520 A1 | 3/2006 | Miyazawa | |
| 2006/0068729 A1 | 3/2006 | Yu et al. | |
| 2006/0131156 A1 | 6/2006 | Voelckers | |
| 2006/0146017 A1 | 7/2006 | Leung et al. | |
| 2006/0152484 A1 | 7/2006 | Rolus Borgward | |
| 2006/0294306 A1 | 12/2006 | Hong | |
| 2007/0016965 A1* | 1/2007 | Dan et al. | 726/34 |
| 2007/0247551 A1 | 10/2007 | Raines | |
| 2007/0250193 A1 | 10/2007 | Raines et al. | |
| 2007/0263473 A1 | 11/2007 | Raines | |
| 2007/0273643 A1 | 11/2007 | Erez et al. | |
| 2008/0005424 A1 | 1/2008 | Raines et al. | |
| 2008/0119290 A1* | 5/2008 | Lee et al. | 463/47 |

FOREIGN PATENT DOCUMENTS

| | | |
|---|---|---|
| EP | 0974945 | 7/1999 |
| EP | 1 315 361 A1 | 5/2003 |
| EP | 1583363 | 3/2004 |
| EP | 1 583 363 A1 | 10/2005 |
| EP | 1 635 354 A2 | 3/2006 |
| TW | M275468 | 9/2005 |
| TW | M280056 | 11/2005 |
| TW | 1349483 | 9/2011 |
| WO | WO01/61932 | 8/2001 |
| WO | WO 01/61974 A1 | 8/2001 |
| WO | WO 2005/124932 A2 | 12/2005 |
| WO | WO 2006/073444 A1 | 7/2006 |
| WO | WO 2007/122606 A1 | 11/2007 |
| WO | WO 2007/122612 A1 | 11/2007 |
| WO | WO 2007/129314 A1 | 11/2007 |
| WO | WO 2007/132462 A1 | 11/2007 |
| WO | WO 2007/135686 A3 | 11/2007 |

OTHER PUBLICATIONS

Communication pursuant to Article 94(3) EPC for European application No. 07736326.5 (Nov. 3, 2010).

Taiwanese Official Action for Taiwanese Application No. 096116141 (Oct. 26, 2010).

Final Office Action for U.S. Appl. No. 11/716,648 (Oct. 7, 2010).

Chinese Official Action for Chinese Application No. 200780014150.6 (Mar. 1, 2010).

Official Action for U.S. Appl. No. 11/716,648 (Jan. 20, 2010).

Chinese Official Action for Chinese Application No. 200780014016.6 (Dec. 25, 2009).

Notice of Allowance and Fee(s) Due for U.S. Appl. No. 11/747,928 (Dec. 31, 2009).

Chinese Official Action for Chinese Application No. 200780017688.2 (Jun. 10, 2010).

Chinese Official Action for Chinese Application No. 200780020575.8 (Apr. 29, 2010).

Notice of Allowance and Fee(s) Due for U.S. Appl. No. 11/747,928 (Aug. 20, 2009).

Official Action for U.S. Appl. No. 11/747,928 (Jan. 26, 2009).

Notification of Transmittal of the International Search Report and the Written Opinion of the International Searching Authority, or the Declaration for International Application No. PCT/IL2007/000630 (Nov. 20, 2007).

Notification of Transmittal of the International Search Report and the Written Opinion of the International Searching Authority, or the Declaration for International Application No. PCT/IL2007/000586 (Oct. 16, 2007).

Notification of Transmittal of the International Search Report and the Written Opinion of the International Searching Authority, or the Declaration for International Application No. PCT/IL2007/000545 (Oct. 5, 2007).

Notification of Transmittal of the International Search Report and the Written Opinion of the International Searching Authority, or the Declaration for International Application No. PCT/IL2007/000493 (Sep. 28, 2007).

Notification of Transmittal of the International Search Report and the Written Opinion of the International Searching Authority, or the Declaration for International Application No. PCT/IL2007/000477 (Aug. 28, 2007).

Official Action for for U.S. Appl. No. 11/747,929 (Jun. 10, 2011).

Notice of Allowance for Taiwanese Patent Application No. 096116141 (May 31, 2011).

Chinese grant notice for Chinese patent application No. 200780020575.8 (May 20, 2011).

Notice of Panel Decision from Pre-Appeal Brief Review for U.S. Appl. No. 11/716,648 (Apr. 28, 2011).

Official Action for U.S. Appl. No. 11/710,925 (Mar. 30, 2011).

Official Action for U.S. Appl. No. 11/710,988 (Feb. 2, 2011).

Final Official Action for U.S. Appl. No. 11/747,929 (Dec. 1, 2011).

Notice of Abandonment for U.S. Appl. No. 11/716,648 (Nov. 7, 2011).

Notice of Allowance for U.S. Appl. No. 11/710,925 (Oct. 12, 2011).

Notice of Abandonment for U.S. Appl. No. 11/710,988 (Aug. 16, 2011).

* cited by examiner

REMOTELY CONTROLLABLE MEDIA DISTRIBUTION DEVICE

RELATED APPLICATION

This application claims priority under 35 U.S.C. §119(e) to U.S. Provisional Application No. 60/746,653, filed May 8, 2006, which is hereby incorporated by reference in its entirety.

BACKGROUND

A digital content player, for example, a digital television or a digital audio player, plays digital content data, which are input from a variety of sources. Broadcasted data may arrive via radio or cable transmission. The digital content player may also host an accessory, such as a digital video disk (DVD) player or a compact disk (CD) player, to play digital content data stored on a nonvolatile memory medium. Typically, a digital content player will include a mechanism to enable a user to remotely control the playing of digital content data.

FIG. 1 shows an example from the prior art of a digital content player interfacing with an accessory for playing pre-recorded digital content data. A digital television 10 is connected to a DVD player 12 by a cable 14. A user may control operation of digital television 10 by using a wireless remote control transmitter 16 to send control signals to a wireless remote control receiver 20 affixed onto digital television 10. Similarly, the user may control operation of DVD player 12 by using a second wireless remote control transmitter 22 to send control signals to a wireless remote control receiver 24 affixed on DVD player 12.

Typically, signals from the remote control transmitter for a digital television are not recognized by a DVD player connected thereto, and signals from the remote control transmitter of the DVD player are not recognized by the digital television. Thus, a user playing DVD data must use two different remote control transmitters, which becomes burdensome, especially if the user operates the remote control transmitters with only the dominant hand.

Frequently, a user wants to add functionality to an existing digital content player, and the addition of functionality may require yet another remote control transmitter for complete wireless control of the system. For example, a user of digital television 10 may want to subscribe to a commercial cable programming provider, and, depending on the television and/or cable service, the user may need a separate remote control transmitter to play the cable programs. Clearly, it would be advantageous to be able to add accessories to the digital content player without needing to add an additional remote control transmitter for complete wireless operation of the system.

Advances in solid state electronics, which involve no physically-moving parts, make such technology desirable for use with digital content players, due in part to increased reliability, faster processing speed, and larger memory size. Thus, another functionality that a user may want to add to a digital content player is the ability to play digital data stored in a solid state memory of an attached accessory.

An example solid state memory device, a Universal Serial Bus (USB) flash drive (UFD), has a relatively large memory size and a relatively small physical size. Such attributes are attractive for users wanting to transfer data without installing elaborate communication networks.

For example, a home personal computer may store a digital recording of a television program or a concert, or the personal computer may be linked to such a recording through the Internet. A user may want to copy the recording onto a UFD and then bring the UFD to a digital content player in another room or in another person's home. Copying the program onto a UFD and then plugging it into a digital content player elsewhere obviates the need to install a home network or to send the data to another home via the Internet. Both of these latter alternatives may not be practical in some situations.

A user wanting to play the digital content data stored on the UFD would likely want to be able to control the digital content player with a remote control transmitter. However, a modification of the digital content player to enable its remote control transmitter to play data stored on an UFD currently would be regarded as complex and expensive. Additionally, because manufacturers of digital content players and manufactures of solid state memory devices are often separate entities, the coordination required between the two entities to modify properly the existing technology would be anticipated as quite large and maybe prohibitive.

Thus, to the best knowledge of the present inventors, there remains an unmet need for a portable storage device that can accept large amounts of data and can transfer them to a digital content player under the control of the digital content player's remote control transmitter.

SUMMARY

The present invention enables a portable storage device connected to a digital content player to be played using the digital content player's remote control transmitter. The invention does not require extensive modifications to existing digital content players, nor does it require elaborate communications between manufacturers of digital content players and manufactures of solid state memory devices.

The present invention may be embodied as a portable storage device connectable to and detachable from a digital content player that is controllable by a wireless remote control transmitter. The digital content player may be a digital television or a digital audio player. In this embodiment, the portable storage device has a memory and a wireless remote control receiver operative for communication with the remote control transmitter of the digital content player.

In some embodiments, the portable storage device includes a processor configured to process digital content data, which may be audio or audio/visual data. The processor may be further configured to generate an on-screen display image, which can include a menu informing the user of the options for which stored digital content data to play and how to control the playing. The processor may also be configured to process protocol information that is specific to the digital content player. The protocol information may be received from an external source, such as a personal computer, or from an RFID tag in the digital content player.

The invention may also be embodied as a digital content playing assembly, which has a digital content player and a portable storage device. The digital content player is controllable by a wireless remote control transmitter and a wireless remote control receiver. The portable storage device has a memory and its own wireless remote control receiver, and the portable storage device is detachable from and connectable to the digital content player. The wireless remote control transmitter is operative for communication with both wireless remote control receivers.

The invention may also be embodied as a method of using the digital content playing assembly. The method includes connecting the portable storage device to the digital content player and transferring digital content data from the portable storage device to the digital content player.

In some embodiments, the method includes connecting the portable storage device to an external source and transferring digital content data from the external source to the portable storage device. Embodiments may also include sending a signal from the wireless remote control transmitter to the wireless remote control receiver of the portable storage device to select some or all of the transferred digital content data and sending a signal from the wireless remote control transmitter to the wireless remote control receiver of the portable storage device to play the selected digital content data.

In other embodiments, the method includes using the portable storage device to process protocol information that is specific to the digital content player. The method may also include transferring the protocol information from the digital content player or from an external source, such as a personal computer, to the portable storage device. The method may require selecting protocol information from the protocol information of one or more protocols, which are stored in the memory of the portable storage device.

In another embodiment of the invention, the portable storage device does not have a processor therein. In its absence, the processor of a personal computer performs the functions attributed to the processor in the portable storage device of the earlier-described embodiments.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

DETAILED DESCRIPTION

The invention summarized above and defined by the claims below may be better understood by referring to the present detailed description of embodiments of the invention. This description is not intended to limit the scope of claims but instead to provide examples of the invention. Described first is one embodiment with reference to both the individual elements of the assembly and an exemplary method of its use. Described next are variations of this embodiment, such variations remaining within the scope of the invention.

Figure 1:
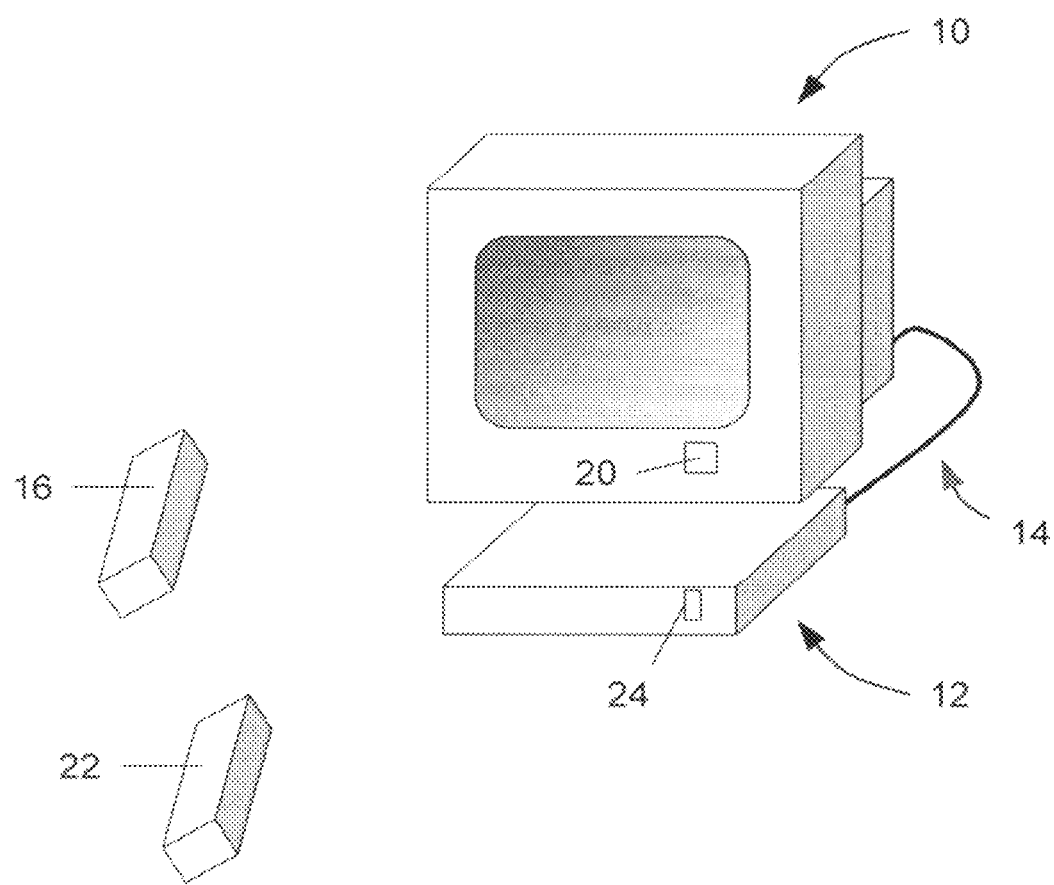
FIG. 1 illustrates a prior art arrangement of a digital content player interfacing with an accessory for playing prerecorded digital content data.
Figure 2:
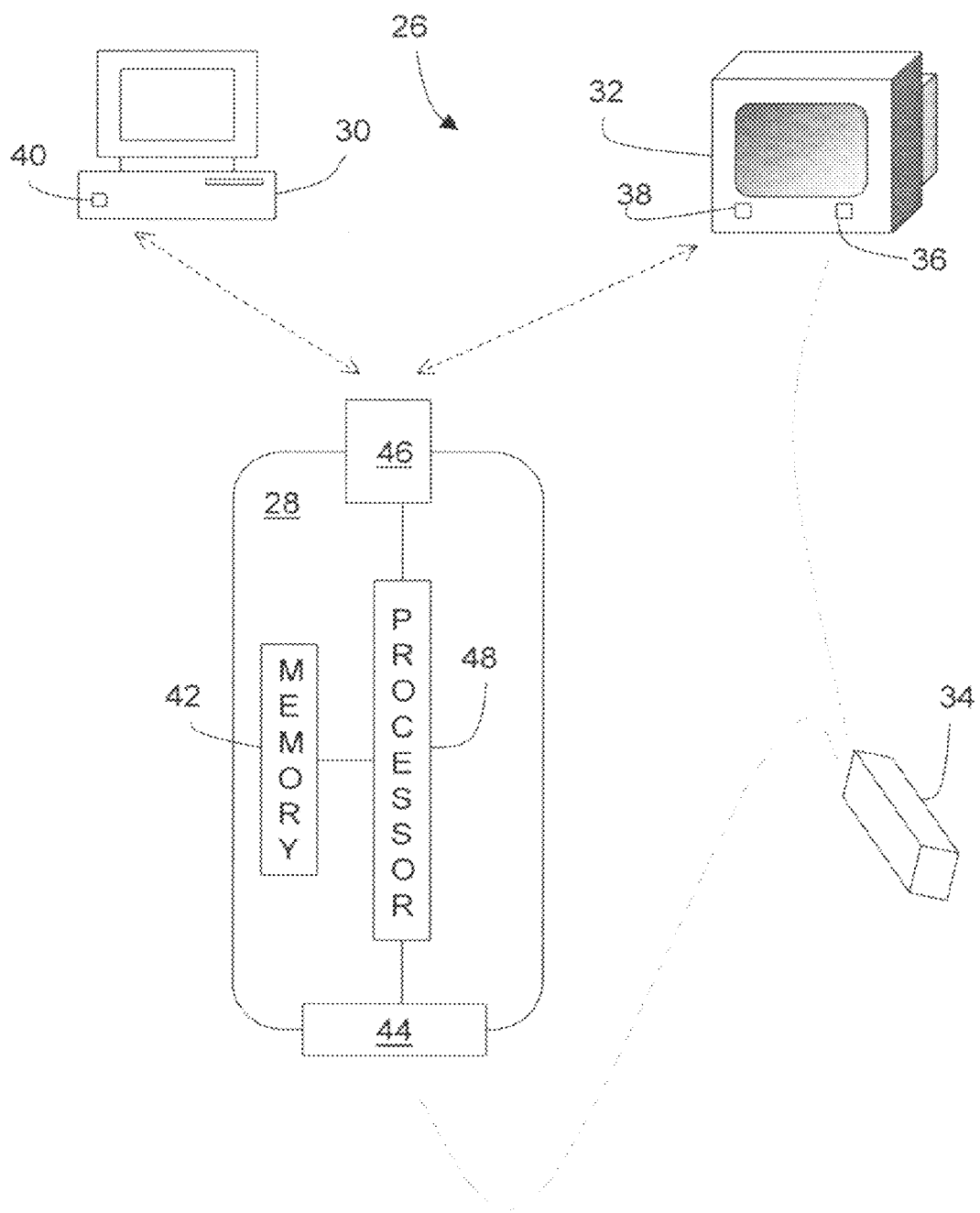
FIG. 2 illustrates a digital content playing assembly, which is an exemplary embodiment of the invention.

FIG. 2 illustrates an exemplary embodiment of a digital content playing assembly 26 having a portable storage device 28 that obtains digital content data from an external source, personal computer 30, and then provides data in a suitable format to a digital content player, digital television 32. Digital television 32 may be operated by a wireless remote control transmitter 34, which sends control signals to a wireless remote control receiver 36 affixed on digital television 32. The control signals may be infrared or ultrasonic. Digital television 32 has a USB-compatible jack 38, and personal computer 30 has a USB-compatible jack 40. These jacks enable digital television 32 and personal computer 30 for connection to accessories. Such jacks on personal computers are well known in the art. USB-compatible jack 38 of digital television 32 may be modified to have additional pins to accommodate portable storage devices that are specially-modified to support additional functionality.

Portable storage device 28 includes a flash memory 42, a wireless remote control receiver 44, a USB-compatible connector plug 46, and a processor 48. Wireless remote control receiver 44 is configured to receive signals from wireless remote control transmitter 34 and to forward the signals to processor 48. Upon receipt of these signals, processor 48 directs the management of flash memory 42 and sends control and content signals to connector plug 46 for use by digital television 32. Processor 48 also directs content signals between connector plug 46 and memory 42, and, when appropriate, processor 48 also reformats the data stored in memory 42.

Accordingly, portable storage device 28 is constructed by: configuring memory 42 to be operative to store multi-media data and protocol information; configuring remote control receiver 36 to be operative to receive remote control signals and to direct the signals to processor 48; configuring processor 48 to be operative to retrieve multi-media data from memory 48 as directed by the remote control signals; and further configuring processor 48 to be operative to cause the portable storage device 28 to output the retrieved multi-media data in a format consistent with the protocol information.

The present disclosure uses the term "processor" in a general fashion to represent hardware, software, firmware, or any combination thereof that effects processing and controls elements as described herein. As discussed, the processor controls the conversion of data to different formats and the transfer of data between elements. The processor may include known central processing units and controllers.

Portable storage device 28 becomes a remotely controllable media distribution device. Its operation is now explained with reference to FIG. 2a, representing portable storage device 28 interfacing with personal computer 30, with reference to FIG. 2b, representing portable storage device 28 interfacing with digital television 32, and with reference to FIG. 3, presenting a flow chart 50 depicting steps for using portable storage device 28.

Portable storage device 28 obtains digital content data from personal computer 30. The digital content data may reside on a hard disk drive of personal computer 30 or on a DVD inserted into a DVD drive. Alternatively, personal computer 30 may be linked through a network, such as the Internet, to a provider of digital content data.

Figure 2A:
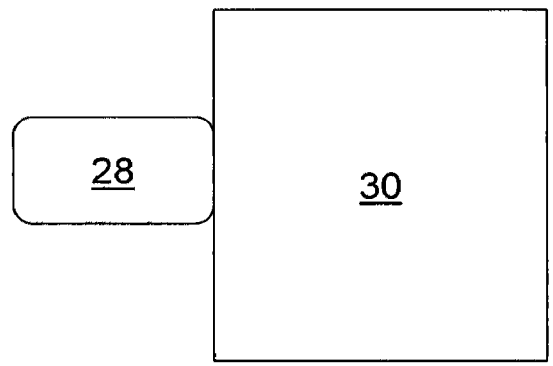
FIG. 2a illustrates the interface of the portable storage device and the personal computer of FIG. 2.
Figure 2B:
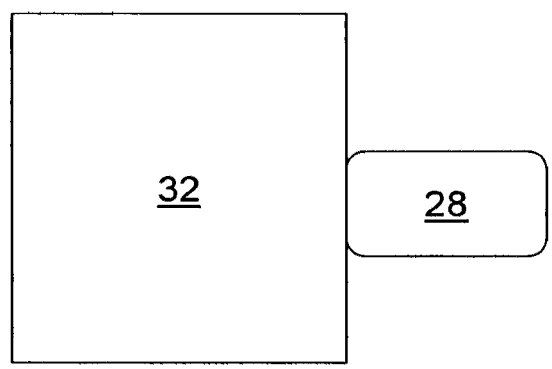
FIG. 2b illustrates the interface of the portable storage device and the digital television of FIG. 2.
Figure 3:
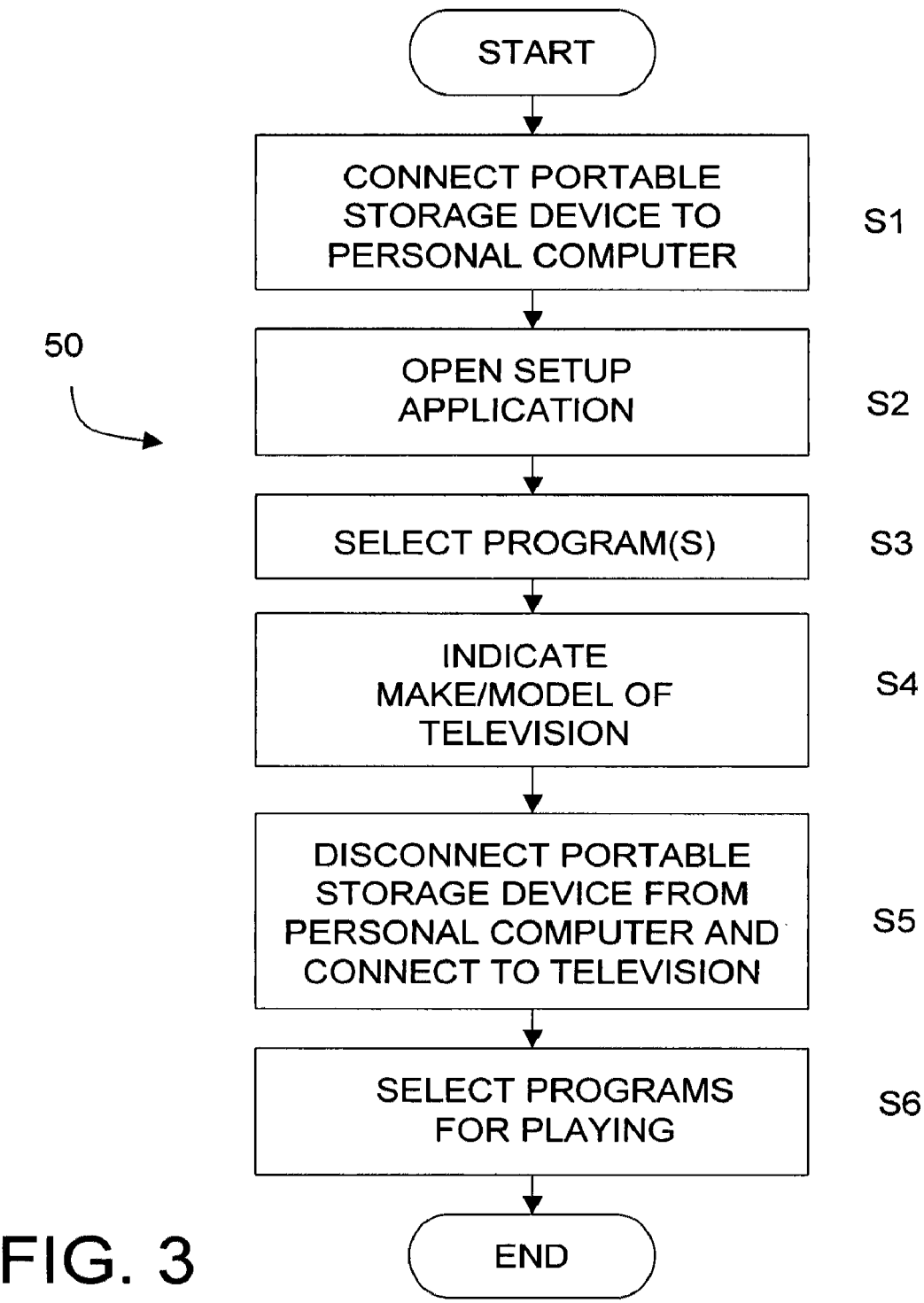
FIG. 3 presents a flow chart depicting steps for using the embodiment of FIG. 2.

To effect data transfer from personal computer 30 to portable storage device 28, the user begins by connecting portable storage device 28 to personal computer 30 as shown in FIG. 2a. [Step S1.] Specifically, the user inserts connector plug 46 of portable storage device 28 into jack 40 of personal computer 30.

The user then opens a setup application on personal computer 30. [Step S2.] The setup application may be preloaded or accessible through a network, such as the Internet. If the setup program is preloaded, it may reside either on personal computer 30 or on portable storage device 28. Using the setup application, the user selects programs intended to be played later on digital television 32. [Step S3.] The selected programs may include movies and/or sporting events. The user also indicates to the setup application the model and the make of digital television 32. [Step S4.] The setup application then identifies corresponding protocol information either from the setup application's own memory or from an outside source, such as the Internet. Based on the user's selections, the setup application transfers content data corresponding to the programs and protocol information corresponding to digital television 32 to portable storage device 28.

Upon conclusion of the digital data transfer, the user disconnects portable storage device 28 from personal computer 30 and then connects it to digital television 32 as shown in FIG. 2b. [Step S5.] Specifically, the user inserts connector plug 46 of portable storage device 28 into jack 38 of digital television 32. Digital television 32 treats the link to portable storage device 28 analogously to how it treats its links to other accessories storing digital content data for playing. For example, just as digital television 32 plays digital content data from an attached DVD player, it also plays digital content data from portable storage device 28 when it is attached.

In the present embodiment, upon connection of portable storage device 28 to digital television 32, processor 48 receives power and generates signals for digital television 32 to display a menu informing the user of the options for which stored digital content data to play. The user selects the desired digital content data using remote control transmitter 34, which interacts with portable storage device 28 as follows:

The menu displayed on digital television 32 lists both the options for which stored digital content data to play and control options, such as "play," "rewind," "fast-forward," "stop," and "pause." For each option displayed, the menu indicates a corresponding key or key combination on the keypad of remote control transmitter 34. The key or key combination indicated are those that ordinarily have no effect on digital television 32 when read by remote control receiver 36 affixed directly thereon. Instead, the signals are received by remote control receiver 44 of portable storage device 28 to control the playing on digital television 32 of digital content data stored in portable storage device 28.

The user selects a program to play by pressing the corresponding key or key combination on remote control transmitter 34. [Step S6.] Accordingly, remote control transmitter 34 sends signals to remote control receiver 44 on portable storage device 28. Processor 48 converts the stored digital content data into the appropriate protocol and then sends the data to digital television 32 for playing. If no such conversion is necessary, the processing only transfers the stored data to digital television 32. At any time, the user may perform other control operations (for example, "pause") by pressing corresponding key or key combination on remote control transmitter 34.

Some users may prefer that, for the majority of the time that the program plays on digital television 32, the menu displayed initially for selecting the program would not remain visible on the screen. Accordingly, the processor can clear the menu after a predetermined short period of inaction. To restore the menu later, a single key or key sequence may be reserved, so the user would need to "memorize" no more than one key sequence. Alternatively, the processor may be designed to restore the menu when any key is pressed.

As discussed above, the user practicing this embodiment of the present invention uses the remote control transmitter of the digital content player to play the digital data stored on the portable storage device. There is no need to obtain and operate an additional remote control transmitter. Thus user may copy a recorded program as digital data onto a UFD and then bring the UFD to digital content player in another room or in another person's home. The user only needs to know enough information about the digital content player to be able to load the appropriate protocol information.

The preceding description relates to one embodiment of the invention, and variations of this embodiment are within the scope of the invention. For example, USB-compatible connector plug 46 may be replaced with any other suitable connector for enabling the portable storage device to interface with the digital content player. Also, instead of implementing a digital television as the digital content player, a digital audio player may be implemented.

Additionally, instead of the portable storage device receiving protocol information from a personal computer, the protocol information could come from the digital content player. One way this may be achieved is to add an RFID reader to the portable storage device and an RFID tag to the digital content player (perhaps on the remote control transmitter). Upon sensing the RFID tag, the RFID reader would send signals to the processor that are indicative of the protocol.

The embodiment discussed initially specifies that the digital content data and the protocol information are provided by the same external source. However, the invention can be practiced by using different external sources for the digital content data and the protocol information. That can be useful when the user decides to erase the data corresponding to a recorded program to free space for another program. There may no need to erase also the protocol information. The user may also decide to obtain program data from another external source, such as from a personal computer in another home or in a public place.

In another embodiment, the user obtains the portable storage device already storing the protocol information corresponding to one or more protocols. The processor tries each protocol consecutively, until it finds a protocol that is operative with the particular digital content player connected at the time to the portable storage device.

In a further embodiment, a portable storage device without proper protocol information may be programmed to operate anyway, albeit with a reduced set of commands. More specifically, the portable storage device can be programmed to toggle between playing the digital content data and pausing the playing of said data. In this embodiment, the portable storage device responds to pairs of commands that cancel each other, for example, "mute on"/"mute off" or "volume up"/"volume down." The portable storage device can be set to toggle when it detects a quick sequence of "mute on"/"mute off"/"mute on"/"mute off."

Although the portable storage device could be programmed to toggle in response to only one pair of commands that cancel each other, instead of in response to two pairs as discussed above, the toggle feature would be more likely to be activated unintentionally by the user attempting to control the digital content player. For example, a user deciding which volume is the preferred volume does not want to pause the playing of the digital content data.

A portable storage device embodied by the present invention can even be programmed to play automatically in response the power it receives upon connection to a digital content player. The playing would begin even if there is no remote control transmitter available.

The embodiments discussed above include a processor as part of the portable storage device. However, some embodiments of the present invention do not need a processor in the portable storage device.

For example, one embodiment implements a personal computer to play digital content data stored in the memory of the portable storage device. The portable storage device is connected to the personal computer in an arrangement that is analogous to that shown in FIG. 2a. The portable storage device does not have a processor, because the processor of the personal computer performs the functions attributed to the processor in the portable storage device of the earlier-described embodiments.

One use for this embodiment is in households that do not position a personal computer immediately adjacent "living-room-type" furniture. Because the portable storage device is operated by remote control, the user may relax in comfortable living room furniture and play digital audio data using one of the household's existing remote control transmitters. The protocol information associated with the remote control transmitter can be loaded into the memory of the personal computer in a fashion analogous to the previously-discussed loading of protocol information into memories. Because many personal computers now in use do not have wireless remote control functionality, the portable storage device of this embodiment, having a memory and a wireless remote control receiver, can be especially useful.

The preceding discussion presents the use one of the household's existing remote control transmitters, and the remote control transmitter does not even need to be that of a digital content player. For example, with the proper protocol information, the portable storage device may be programmed to play in response to commands from a remote control transmitter that controls a household air conditioner.

Furthermore, the user has the option of designating a single remote control transmitter for use with the portable storage device. Thus, for the additional minor requirement of carrying a remote control transmitter with the portable storage device, the user would not need to continually reprogram the portable storage device for use with multiple digital content players. That is, if the user wants to play digital content data on a digital content player, it is not necessary to use only the remote control transmitter that the manufacturer provided as part of the digital content player.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

We claim:

1. A portable storage device connectable to and detachable from a digital content player, the digital content player being controllable by a wireless remote control transmitter, the portable storage device comprising:
    a memory;
    a wireless remote control receiver configured to wirelessly receive signals from the remote control transmitter that communicates wirelessly with the digital content player, wherein the portable storage device is a universal serial bus (USB) flash drive (UFD) having a connector plug for connecting with the media player, wherein the wireless remote control receiver is located within the UFD; and
    a processor, located within the UFD and configured to, in response to the signals, direct management of the memory to send content signals to the connector plug for use by the digital content player.

2. The portable storage device of claim 1 wherein the processor is configured to process digital content data.

3. The portable storage device of claim 2, wherein said processor is configured to process digital content data that includes audio data.

4. The portable storage device of claim 2, wherein said processor is configured to process digital content data that includes audio/visual data, and said processor is further configured to generate an on-screen display image.

5. The portable storage device of claim 1
    wherein the processor is configured to process protocol information received from an external source, said protocol information being specific to the digital content player.

6. The portable storage device of claim 5, wherein said external source is a personal computer.

7. The portable storage device of claim 1
    wherein the processor is configured to process protocol information received from the digital content player, said protocol information being specific to the digital content player.

8. The portable storage device of claim 1 further comprising:
    an RFID reader; and
    a processor configured to process protocol information received via said RFD reader from the digital content player, said protocol information being specific to the digital content player.

9. A digital content playing assembly comprising:
    a digital content player having a first wireless remote control receiver;
    a universal serial bus (USB) flash drive (UFD) having a memory, a processor, a connector plug, and a second wireless remote control receiver located within the UFD, said portable storage device being detachable from and connectable to said digital content player; and
    a wireless remote control transmitter,
    wherein said digital content player is controllable by said wireless remote control transmitter, and said wireless remote control transmitter is operative for wireless communication with both said first and said second wireless remote control receivers, wherein the second wireless remote control receiver is configured to wirelessly receive signals from the wireless remote control transmitter, wherein the processor is configured to, in response to the signals, direct management of the memory to send content signals to the connector plug for use by the digital content player.

10. The digital content assembly of claim 9, wherein said processor is configured to process digital content data.

11. The digital content assembly of claim 10, wherein said processor is configured to process digital content data that includes audio data, and wherein said digital content player is an audio player.

12. The digital content assembly of claim 10, wherein said processor is configured to process digital content data that includes audio/visual data, wherein said processor is further configured to generate an on-screen display image, and wherein said digital content player is a television.

13. The digital content assembly of claim 9, wherein said processor is configured to process protocol information received from an external source, said protocol information being specific to said digital content player.

14. The digital content assembly of claim 13, wherein said external source is a personal computer.

15. The digital content assembly of claim 9, wherein said processor is configured to process protocol information received from said digital content player, said protocol information being specific to said digital content player.

16. The digital content assembly of claim 9, wherein said digital content player or said remote control transmitter has an RFID tag providing protocol information, wherein said portable storage device has an RFID reader and said processor is configured to process said protocol information, and wherein said protocol information is specific to said digital content player.

* * * * *